June 12, 1962    J. HADLEY    3,039,054
APPARATUS FOR MEASURING THE FREQUENCY OF ELECTRIC WAVES
Filed Nov. 23, 1959
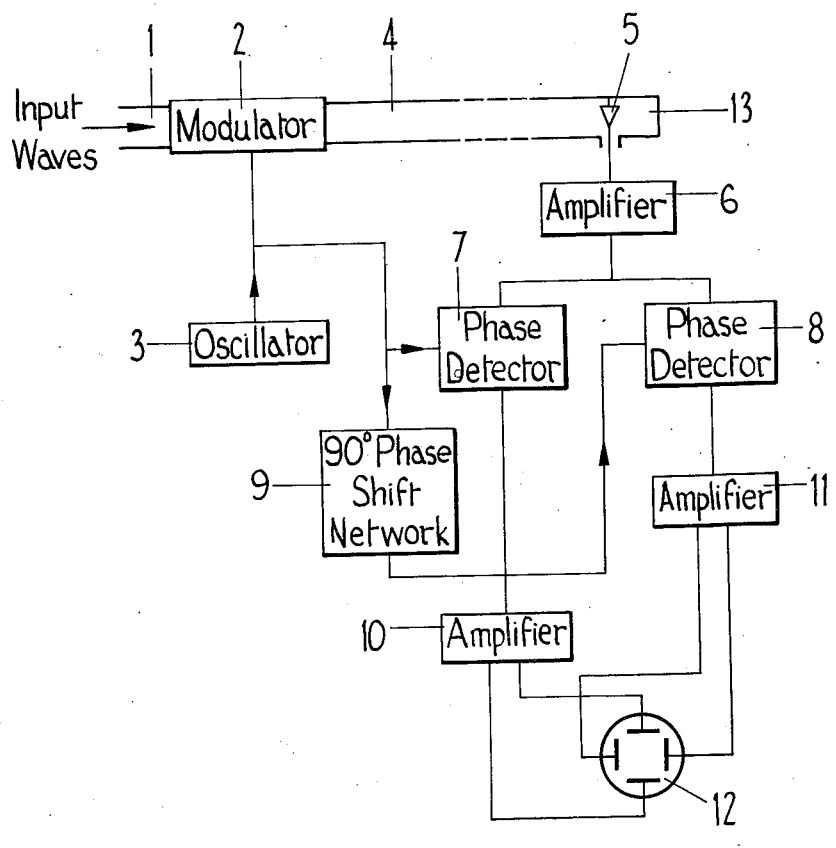
INVENTOR
JOHN HADLEY
BY Kirschstein, Kirschstein & Ottinger
ATTORNEYS

United States Patent Office 3,039,054
Patented June 12, 1962

3,039,054
APPARATUS FOR MEASURING THE FREQUENCY OF ELECTRIC WAVES
John Hadley, St. Albans, England, assignor to The General Electric Company Limited, Kingsway, London, England
Filed Nov. 23, 1959, Ser. No. 854,837
Claims priority, application Great Britain Nov. 26, 1958
3 Claims. (Cl. 324—82)

This invention relates to apparatus for measuring the frequency of electric waves and it is to be understood that, where appropriate in the present specification, the term "electric waves" is to be construed as including electromagnetic waves.

More particularly, but not exclusively, the invention is concerned with the measurement of frequencies of the order of thousands of megacycles per second.

One object of the present invention is to provide improved apparatus which is for measuring the frequency of electric waves and which is arranged to supply an electric signal that is characteristic of the frequency of such waves at least over a range of frequencies.

In apparatus according to the present invention for measuring the frequency of electric waves, there is means to modulate the waves to be measured at a relatively low frequency and to supply the modulated waves to a transmission path that is dispersive and means which is arranged, in dependence upon the modulation of the said waves after transmission over said path, to supply an electric signal that is characteristic of the frequency of said waves at least over a range of frequencies.

The transmission path may be a length of waveguide.

One example of apparatus in accordance with the present invention for measuring the frequency of electromagnetic waves, say in the region of 15,000 megacycles per second, will now be described with reference to the accompanying drawing which shows diagrammatically the circuit of the apparatus.

Referring now to the drawing the input waves the frequency of which is to be measured are supplied over a waveguide 1 to a modulator 2 which may conveniently be formed by a travelling wave tube. An oscillator 3 is arranged to supply electric oscillations having a relatively low frequency, say 60 megacycles per second, and these oscillations are fed to the modulator 2 for the purpose of amplitude modulating the input waves. The waves supplied by the modulator 2 are transmitted over a long length of waveguide 4 to a crystal detector 5 which is arranged to derive the modulation signal. This modulation signal is then passed through an amplifier 6 to two phase detectors 7 and 8, each of these phase detectors 7 and 8 being arranged to compare the phase of the signal passed by the amplifier 6 with reference oscillations supplied by the oscillator 3.

The phase detectors 7 and 8 are of like construction but the reference oscillations supplied thereto have a phase difference of 90°. In the accompanying drawing a network 9 is shown for the purpose of introducing this phase difference although it is to be understood that in practice the required phase difference may be obtained without such a network merely by using transmission lines of different electrical lengths between the oscillator 3 and the phase detectors 7 and 8.

The signals supplied by the phase detectors 7 and 8 are amplified by means of amplifiers 10 and 11 and are then utilised to control the horizontal and vertical deflection respectively of an electron beam in a cathode ray tube 12.

Before considering the manner of operation of the apparatus described above, it will be appreciated that since a waveguide is inherently dispensive, the group velocity of electromagnetic wave propagated along a waveguide is a function of frequency. It follows therefore that, in the apparatus under consideration, the phase of the modulation signal supplied by the crystal detector 5 is dependent upon the frequency of the waves supplied to the waveguide 4. In other words the phase of the signal passed by the amplifier 6, and thus the amplitude and sense of the signal supplied by each of the phase detectors 7 and 8 is a measure of the frequency of the input waves. (It will, of course, be appreciated that the signal supplied by each of the phase detectors 7 and 8 can only characterise a unique frequency if the whole band of frequencies to be measured corresponds to a phase change of the modulation signal supplied by the crystal detector 5 that does not exceed 180 electrical degrees.)

With the arrangement described for controlling the deflection of the electron beam of the cathode ray tube 12 there is provided an indication of the phase angle of the signal passed by the amplifier 6, over a range of 360°, and this indication is of course also an indication of the frequency of the input waves. The cathode ray tube 12 is in fact arranged so that, in the absence of any signals supplied by the two phase detectors 7 and 8, there is produced a bright spot on the screen (not shown) of the tube, the position of this spot subsequently being termed the "normal spot position." If, during operation of the apparatus, the input waves are continuous, that is to say uninterrupted, the signals supplied by the two phase detectors 7 and 8 serve to deflect the electron beam to move the bright spot to another position on the screen of the cathode ray tube 12. The position of this spot on the screen, or more precisely the angle between the imaginary straight line passing through both this spot and the normal spot position and a datum line which also passes through the normal spot position, is a measure of the frequency of the input waves. This imaginary line may in fact be produced as a visible trace extending radially on the screen of the cathode ray tube from the normal spot position, merely by periodically interrupting the connections for passing to the cathode ray tube the signals supplied by the two phase detectors 7 and 8, for example by means of chopper circuits (not shown). It will be realised that the length of this line is determined by the signals supplied by the two phase detectors 7 and 8 and is therefore dependent on the amplitude of the input wave but is independent of the frequency of the input wave.

In one example of the apparatus described above, the waveguide 4 has a length of ten metres and is of rectangular cross-section having internal dimensions of 1.58 centimetres and 0.79 centimetre. Such an arrangement has been found suitable for measurements over the frequency band from 12,000 to 18,000 megacycles per second, the said imaginary line on the screen of the cathode ray tube sweeping through an angle of about 320° between the limits of this band. In order to reduce the actual size of the apparatus, this waveguide may conveniently be coiled up, for example into a helix, and since it is not required to handle large powers, the narrower internal dimension of the waveguide may be somewhat less than that stated.

The cathode ray tube display enables a very rapid indication to be given of the frequency of input waves, and is therefore suitable for use in cases where the input waves are not continuous but are in the form of pulses. If the input waves are pulsed it is convenient to provide pulse widening circuits (not shown) between the phase detectors 7 and 8 and the amplifiers 10 and 11.

It will be appreciated that if the indication given on the screen of the cathode ray tube 12 is required to be an indication of the absolute frequency of the input waves, it is necessary for the phase shift introduced by the amplifier 6 to be fixed and independent of temperature changes and aging of components. For this purpose a portion of the oscillation supplied by the oscillator 3 may be passed directly to the input of the amplifier 6. The resulting direct current component of the signal supplied by one of the phase detectors 7 and 8 may then be utilised to control a variable element or elements in the amplifier 6 so as to tune that amplifier to give the amplifier a predetermined phase shift, the arrangement being such that when the amplifier 6 is tuned in this manner the said direct current component has a very low amplitude.

For accurate measurement with the apparatus described above, it is necessary for the waveguide 4 to be accurately terminated at the end 13. If the termination does not match the waveguide 4, multiple reflections may be set up in the waveguide thereby effecting the apparent phase of the amplitude modulation of the waves supplied to the crystal detector 5.

In a modified arrangement the end 13 of the waveguide 4 is short circuited and the waveguide 4 is fed from the modulator 2 by way of a circular (not shown). The crystal detector 5 is connected to the said circulator with the result that waves passed by the modulator 2 are fed to the crystal detector 5 after passing twice along the length of the waveguide 4. It will be appreciated that in this case the waveguide 4 need be only half the physical length that was previously necessary for the same phase shift. Furthermore instead of providing an actual short circuit at the end 13 of the waveguide 4, that waveguide may be tapered so that its cross-section is reduced; thus as a wave proceeds along the waveguide 4 from the modulator 2, the cross-section of the waveguide is gradually reduced until it is unable to support the mode of propagation and there is then effectively a short circuit across the waveguide at that point. The position of the effective short circuit is of course frequency dependent and this fact may be utilised to compensate, at least in part, for the non-linear display, in terms of frequency, on the screen of the cathode ray tube 12.

The arrangement described in the last paragraph may be further modified by replacing the said circulator by a directional coupler. In this case it is convenient for the coupler to be of the kind which introduces a phase shift of 90°, the waveguide 1 and the crystal detector 5 being connected to one side of the coupler while the waveguide 4 and another identical waveguide being connected to the other side of the coupler. This ensures that, apart from losses, the energy of the input waves passed by the modulator 2 is all fed to the crystal detector.

I claim:

1. Apparatus for measuring the frequency of electric waves comprising an input path for said waves, a source of electric oscillations, a transmission path that is dispersive, an amplitude modulator connected to said input path, to said source of oscillations and to one end of said transmission path, said modulator being arranged to amplitude modulate waves passed thereto over the input path and to supply the resulting amplitude modulated waves to the transmission path, a demodulator connected to the other end of said transmission path to derive the modulation on the waves reaching that end of the transmission path, and a phase detector which is connected to said demodulator and which is arranged to supply an electric signal having an amplitude that is dependent upon the phase of the oscillations supplied by the demodulator and thereby upon the frequency of the waves on the input path.

2. Apparatus according to claim 1 wherein the transmission path is a waveguide.

3. Apparatus according to claim 1 in combination with means to provide a display on the screen of a cathode ray tube of the phase of said signal, said display thus giving an indication of the frequency of said waves.

References Cited in the file of this patent

UNITED STATES PATENTS

| | | |
|---|---|---|
| 2,480,128 | Frum | Aug. 30, 1949 |
| 2,580,148 | Wirkler | Dec. 25, 1951 |
| 2,745,014 | Norton | May 8, 1956 |
| 2,758,204 | Norby | Aug. 7, 1956 |
| 2,790,143 | Kyhl | Apr. 23, 1957 |
| 2,869,415 | Kaye | Jan. 20, 1959 |
| 2,871,460 | Beebe | Jan. 27, 1959 |
| 2,882,395 | White | Apr. 14, 1959 |
| 2,889,516 | Staschover | June 2, 1959 |
| 2,897,442 | Wright | July 28, 1959 |